US011861411B2

(12) United States Patent
Sodagar

(10) Patent No.: US 11,861,411 B2
(45) Date of Patent: Jan. 2, 2024

(54) VARIABLE AND EVENT REPORTING IN A CLOUD SERVICE SYSTEM

(71) Applicant: Tencent America LLC, Palo Alto, CA (US)

(72) Inventor: Iraj Sodagar, Los Angeles, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 17/940,972

(22) Filed: Sep. 8, 2022

(65) Prior Publication Data

US 2023/0004446 A1 Jan. 5, 2023

Related U.S. Application Data

(63) Continuation of application No. 17/029,968, filed on Sep. 23, 2020, now Pat. No. 11,500,687.

(60) Provisional application No. 62/907,322, filed on Sep. 27, 2019, provisional application No. 62/907,327, filed on Sep. 27, 2019, provisional application No. 62/907,312, filed on Sep. 27, 2019.

(51) Int. Cl.
*G06F 9/50* (2006.01)
*G06F 9/48* (2006.01)
*G06F 9/54* (2006.01)

(52) U.S. Cl.
CPC ............ *G06F 9/5072* (2013.01); *G06F 9/485* (2013.01); *G06F 9/5077* (2013.01); *G06F 9/542* (2013.01); *G06F 2209/508* (2013.01)

(58) Field of Classification Search
CPC .................................................. G06F 9/5072
See application file for complete search history.

(56) References Cited

U.S. PATENT DOCUMENTS 8,285,808 B1 * 10/2012 Joel ..................... H04L 61/4511
709/224
2005/0193109 A1 9/2005 Hudis et al.
(Continued)

FOREIGN PATENT DOCUMENTS

| JP | 2008543124 A | 11/2008 |
| JP | 2018522336 A | 8/2018 |
| JP | 2019145129 A | 8/2019 |

OTHER PUBLICATIONS

Japanese Office Action Issued in Application 2021-552148 dated Oct. 11, 2022, with English Translation (13 pages).
(Continued)

*Primary Examiner* — Charlie Sun
(74) *Attorney, Agent, or Firm* — ARENTFOX SCHIFF LLP

(57) ABSTRACT

A method for cloud service includes receiving, by processing circuitry that operates for a cloud service, a request including a first reporting descriptor object including (i) a first variables descriptor object associated with variables, (ii) a first events descriptor object associated with events, and (iii) a reporting interval. The method also includes generating, by the processing circuitry, at a time within the reporting interval, a message including a second reporting descriptor object with (i) a second variables descriptor object having updated values for the variables and (ii) a second events descriptor object associated with a subset of the events. The method also includes sending, by the processing circuitry, the message to a recipient.

20 Claims, 17 Drawing Sheets

(56) References Cited

U.S. PATENT DOCUMENTS

| | | |
|---|---|---|
| 2007/0294668 A1 | 12/2007 | Mohindra et al. |
| 2012/0036219 A1 | 2/2012 | Eslambolchi et al. |
| 2012/0089723 A1 | 4/2012 | Mercuri |
| 2015/0207871 A1 | 7/2015 | Li |
| 2016/0098294 A1 | 4/2016 | Vaskova et al. |
| 2021/0208946 A1 | 7/2021 | Watfa et al. |

OTHER PUBLICATIONS

Systems Subgroup, "Text of ISO/IEC DIS3090-8 Network-based Media Processing", Information technology—Coded representation of immersive media—Part 8: Network Based Media Processing, International Organisation For Standardisation Organisation Internationale De Normalisation ISO/IEC JTC1/SC29/WG11 Coding Of Moving Pictures And Audio, ISO/IEC JTC1/SC29/WG11N18657, Gothenburg, SE, Jul. 12, 2019 (156 pages).

International Search Report Issued in Application PCT/US2020/052431 dated Feb. 2, 2021, (14 pages).

Anonymous, "ISO 23090-8—CD Stage: Information technology—Coded representation of immersive media-Part 8: Network Based Media Processing," ISO 23090-8:2018(E), Jan. 18, 2019, pp. 1-100.

Anonymous, "MPEG 125—Marrakesh," The Moving Picture Experts Group, 2019, retrieved from the Internet <URL: https://web.archive.org/web/20190325102112/https://mpeg.chiariglione.org/meetings/125>, pp. 1-4.

Anonymous, "Text of ISO/IEC CD 23090-8 Network-based Media Processing," The Moving Picture Experts Group, Apr. 6, 2019, retrieved from the Internet <URL:https://web.archive.org/web/20190406114232/https://mpeg.chiariglione.org/standars/mpeg-i/network-based-media-processing/text/isoiec/cd-23090-8-network-based-media>, pp. 1-1.

Extended European Search Report in EP20868868.9, dated Aug. 16, 2023, 9 pages.

* cited by examiner

| Variables Descriptor | |
|---|---|
| Variable-1 | Object-1 |
| Variable-2 | Object-2 |
| Variable-3 | Object-3 |
| ... | ... |

FIG. 3

| Characteristic | Explanation of the Characteristic |
|---|---|
| name | variable's name |
| definition | humanly readable definition of the variable |
| value | value of variable |
| unit | unit the variable is measured in |
| var-type | parameter type: "string", "integer", "float", "boolean" |
| min | minimum value of variable's range |
| max | maximum value of variable's range |
| url | unique identifier |

*FIG. 4*

```
{
    "title": "Variables Descriptor Schema",
    "properties" : {
      "type": "array",
      "minItems": 1,
      "uniqueItems": true,
      "items" : {
        "required":   ["name",   "definition",   "unit", "var-type", "value"],
        "properties": {
          "name": {"type": "string"},
          "definition": {"type": "string"},
          "unit": {"type": "string"},
          "var-type": {
            "type" : "string",
            "enum"  :  ["string",  "interger",  "float", "boolean", "number"]
          },
          "value": {"type": "string"},
          "min" :{"type": "integer"},
          "max" :{"type": "integer"},
          "url": {
            "type": "string",
            "format": "url"
          },
          "children": {
            "type" : "array",
            "uniqueItems": true,
            "items" : { "$ref": "#/variables" },
            "default" : []
          }
        }
      }
    }
}
```

*FIG. 5*

| Events Descriptor | |
|---|---|
| Event-1 | Object-1 |
| Event-2 | Object-2 |
| ... | ... |

*FIG. 6*

| Characteristic | Explanation of the Characteristic |
|---|---|
| name | event's name |
| definition | humanly readable definition of the event |
| url | unique identifier |
| one or more values | description for each value |

*FIG. 7*

```
{
    "title": "Events Descriptor Schema",
    "type": "array",
    "minItems": 1,
    "uniqueItems": true,
    "items": {
        "properties": {
            "name": {"type": "string"},
            "definition": {"type": "string"},
            "url": {
                "type": "string",
                "format": "url"
            }
        }
    }
}
```

FIG. 8

REPORTING DESCRIPTOR

| Parameter Name | Type |
|---|---|
| events | Array of Items (Objects) |
| variables | Array of Items (Objects) |
| system-events | Array of Items (Objects) |
| system-variables | Array of Items (Objects) |
| report-type | Parameter |
| reporting-interval | Parameter |
| reporting-collecting | Parameter |
| report-start-time | Parameter |
| url (destination) | Parameter |
| delivery-methods | Parameter |

*FIG. 9*

```json
{
    "title": "Reporting Descriptor Schema",
    "type": "object",
    "required":    [   "reporting-type",    "reporting-interval", "report-start-time", "url", "delivery-method"
    ],
    "properties": {
      "event": { "$ref": "#/events" },
      "variable": { "$ref": "#/variables" },
      "system-events": {
        "type": "array",
        "minItems": 1,
        "uniqueItems": true,
        "items": {
          "type": "object"
        }
      },
      "system-variables": {
        "type": "array",
        "minItems": 1,
        "uniqueItems": true,
        "items": {
          "type": "object"
        }
      },
      "report-type": {
        "type": "string"
      },
      "reporting-interval": {
        "type": "integer",
        "minimum": 0
      },
      "report-start-time": {
        "type": "string",
        "format": "date-time"
      },
      "url": {
        "type": "string",
        "format": "url"
      },
      "delivery-method": {
        "type": "string",
        "default": "HTTP POST"
      }
    }
}
```

FIG. 10

NOTIFICATION DESCRIPTOR

| Parameter Name | Type |
|---|---|
| events | Array of Items (Objects) |
| variables | Array of Items (Objects) |
| system-events | Array of Items (Objects) |
| system-variables | Array of Items (Objects) |
| notification-type | Parameter |
| url (destination) | Parameter |
| notification-interval | Parameter |
| delivery-methods | Parameter |

*FIG. 11*

```
{
    "title": "Notifications Descriptor Schema",
    "type": "object",
    "required": [
      "notification-time",     "severity-level",
"notification-type","urls"
    ],
    "properties": {
      "event": { "$ref": "#/events" },
      "variable": { "$ref": "#/variables" },
      "system-events": {
        "type": "array",
        "minItems": 1,
        "uniqueItems": true,
        "items": {
           "type": "object"
        }
      },
      "system-variables": {
        "type": "array",
        "minItems": 1,
        "uniqueItems": true,
        "items": {
           "type": "object"
        }
      },
```

FIG. 12A

Continue from Fig. 12A

```
"notification-time": {
      "type": "string",
      "format": "date-time"
   },
   "severity-level": {
     "type": "string"
   },
   "notification-type": {
     "type": "array",
     "minItems": 1,
     "uniqueItems": true,
     "items": {
        "type": "string",
        "enum": ["congestion", "application", "system"]
     }
   },
   "urls": {
     "type": "array",
     "minItems": 1,
     "uniqueItems": true,
     "items": {
        "type": "string",
        "format": "url"
     }
   },
   "notification-interval": {
     "type": "integer",
     "minimum": 0,
     "default": 0
   }
  }
}
```

FIG. 12B

MONITORING DESCRIPTOR

| Parameter Name | Type |
|---|---|
| events | Array of Items (Objects) |
| variables | Array of Items (Objects) |
| system-events | Array of Items (Objects) |
| system-variables | Array of Items (Objects) |

*FIG. 13*

```
{
    "title": "Monitoring Descriptor Schema",
    "type": "object",
    "minProperties": 1,
    "properties": {
      "event": { "$ref": "#/events" },
      "variable": { "$ref": "#/variables" },
      "system-events": {
        "type": "array",
        "minItems": 1,
        "uniqueItems": true,
        "items": {
          "type": "object"
        }
      },
      "system-variables": {
        "type": "array",
        "minItems": 1,
        "uniqueItems": true,
        "items": {
          "type": "object"
        }
      }
    }
}
```

*FIG. 14*

VARIABLE AND EVENT REPORTING IN A CLOUD SERVICE SYSTEM

INCORPORATION BY REFERENCE

The present application is a continuation of U.S. application Ser. No. 17/029,968 filed on Sep. 23, 2020, which claims the benefit of priority to U.S. Provisional Application No. 62/907,322, "SELF-CONTAINED REPORTING FOR CLOUD SERVICES" filed on Sep. 27, 2019, U.S. Provisional Application No. 62/907,327, "SELF-CONTAINED MONITORING FOR CLOUD SERVICES" filed on Sep. 27, 2019, and U.S. Provisional Application No. 62/907,312, "SELF-CONTAINED NOTIFICATION FOR CLOUD SERVICES" filed on Sep. 27, 2019. The entire disclosures of the prior applications are hereby incorporated by reference in their entirety.

TECHNICAL FIELD

The present disclosure describes embodiments generally related to cloud service.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various media applications and services require significant processing capability. In some examples, cloud processing is preferred where workloads that otherwise would have been performed on a client device, can be offloaded to remote servers. Because the remote servers have much higher computation capacity, complex media processing tasks can be performed by the remote servers and then final results or near-to-final results can be sent to the client device.

SUMMARY

Aspects of the disclosure provide methods and apparatuses for cloud service. For example, an apparatus in a cloud for providing a cloud service includes processing circuitry. The processing circuitry receives a request including at least first characteristics associated with a variable. In an example, the first characteristics include complete information for describing the variable. The processing circuitry generates a message including the first characteristics associated with the variable and an updated value of the variable and sends the message to a recipient.

In an example, the first characteristics include at least a definition of the variable, a unit of the variable, a format of the variable, and a universal identifier of the variable.

In some examples, the processing circuitry can establish and manage a workflow for the cloud service. In some other examples, the processing circuitry can perform one or more tasks in a workflow for the cloud service.

In some embodiments, the request includes at least second characteristics associated with an event. The second characteristics include complete information for describing the event. The processing circuitry can generate the message that includes the first characteristics associated with the variable and the updated value of the variable, and the second characteristics associated with the event for indicating an occurrence of the event. It is noted that the variable can be a function variable or a system variable, and the event can be a function event or a system event.

In some embodiments, the request includes a first reporting descriptor object with at least a first variables descriptor object associated with variables, a first events descriptor object associated with events, and a reporting interval. The processing circuitry generates, at a time with the reporting interval to a previous message, the message that includes a second reporting descriptor object with a second variables descriptor object having updated values for the variables, and a second events descriptor object associated with a subset of the events.

In some embodiments, the request includes a first notification descriptor object with at least a first variables descriptor object associated with variables, and a first events descriptor object associated with subscribed events. The processing circuitry generates, in response to an occurrence of at least one of the subscribed events, the message that includes a second reporting descriptor object with a second variables descriptor object having updated values for the variables, and a second events descriptor object associated with a subset of the subscribed events.

In some embodiments, the request includes a first monitoring descriptor object with at least a first variables descriptor object associated with variables, and a first events descriptor object associated with events. The processing circuitry receives, the request that is sent from a monitoring entity, and generates, in response to the request, the message that includes a second reporting descriptor object with a second variables descriptor object having updated values for the variables, and a second events descriptor object associated with a subset of the events. Then, the processing circuitry sends the message to the monitoring entity.

It is noted that, in some embodiments, the message includes a request descriptor object that identifies the request.

Aspects of the disclosure also provide a non-transitory computer-readable medium storing instructions which when executed by a computer for cloud service cause the computer to perform the method for cloud service.

BRIEF DESCRIPTION OF THE DRAWINGS

Further features, the nature, and various advantages of the disclosed subject matter will be more apparent from the following detailed description and the accompanying drawings in which:

FIG. 3 shows a list of variables in a function according to some embodiments of the disclosure.

FIG. 4 shows a table of characteristics for a variable according to some embodiments of the disclosure.

FIG. 5 shows an example of a variables descriptor schema according to some embodiments of the disclosure.

FIG. 6 shows a list of events in a function according to some embodiments of the disclosure.

FIG. 7 shows a table of characteristics for an event according to some embodiments of the disclosure.

FIG. 8 shows an example of an events descriptor schema according to some embodiments of the disclosure.

FIG. 9 shows a table of parameters in a reporting descriptor and the corresponding types for the parameters.

FIG. 10 shows an example of a reporting descriptor schema according to some embodiments of the disclosure.

FIG. 11 shows a table of parameters in a notification descriptor and the corresponding types for the parameters.

FIGS. 12A-B show an example of a notification descriptor schema according to some embodiments of the disclosure.

FIG. 13 shows a table of parameters in a monitoring descriptor and the corresponding types for the parameters.

FIG. 14 shows an example of a monitoring descriptor schema according to some embodiments of the disclosure.

DETAILED DESCRIPTION OF EMBODIMENTS

Figure 1:
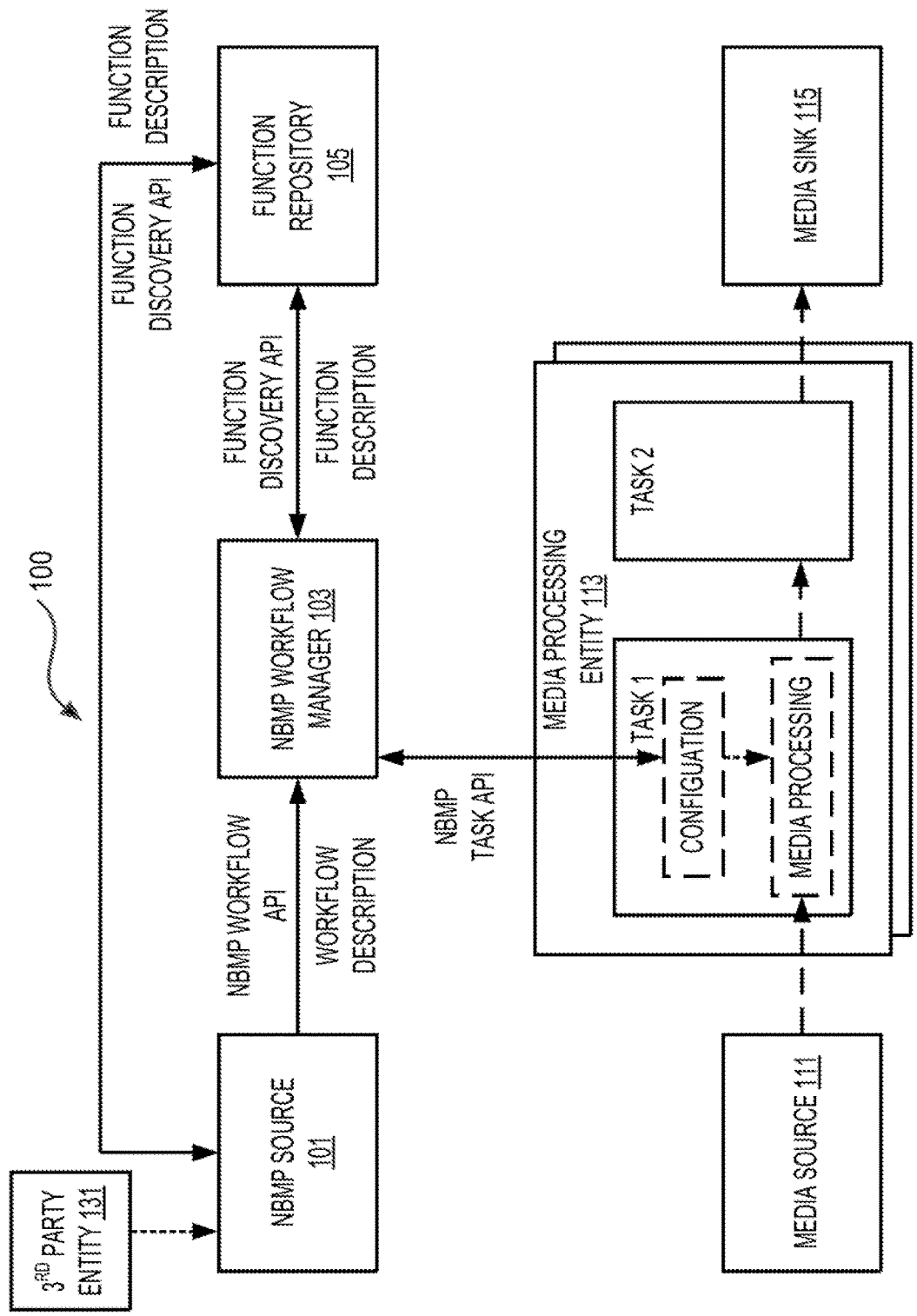
FIG. 1 shows an exemplary media processing system according to an embodiment of the disclosure.

Cloud computing refers to the practice of using a network of remote servers hosted on a network (e.g., the Internet) to deliver information computing services (e.g., cloud services). The network architecture (e.g., including hardware and software) through which the cloud services are provided to service consumers (e.g., clients) is referred to as the cloud. Cloud computing provides access to a wide range of services, such as data processing, media processing, server, storage, network, applications, online services and the like. In some examples, media processing becomes compute intensive, and thus a media processing cloud is preferred to offload significant workloads to remote servers.

Generally, a cloud computing system includes a network, one or more servers, and one or more client devices. The network facilitates communications between the servers and client devices. A client device may be, for example, a smartphone, a tablet computer, a laptop, a personal computer, a wearable device, a head-mounted display (HMD), or the like. A server can include any suitable computing or processing device that can provide computing services for one or more client devices. For example, each server can include one or more processing devices, one or more memories storing instructions and data, and one or more network interfaces facilitating communication over the network. In some embodiments, a server includes a workflow manager that can select functions and build a workflow pipeline to perform a processing task.

According to some embodiments of the disclosure, when computation is offloaded to remote servers, the client device, or a service provider that is responsible for providing the service, may need information regarding the processing status of the service, such as real-time information of the service, and the like. In some examples, actions can be taken in the cloud computing system to provide status information to entities involved in the cloud service. In an example, reporting is an action that is regularly performed (e.g., frequently performed based on a time interval) to provide information about events and variables to a destination during performing of a service. In another example, notifying is an action of providing information to a destination when an event occurs. In another example, monitoring is an action of an entity requesting information and receiving the requested information. For ease of description, in the following description, the status information generated in response to the actions (e.g., reporting, notifying and monitoring) is referred to as status report; the status information generated in response to the reporting action is referred to as regular report; the status information generated in response to the notifying action is referred to as notification report; and the status information generated in response to the monitoring action is referred to as monitoring report.

Aspects of the disclosure provide a framework for reporting, monitoring and notifying in a cloud computing system. The framework can simplify setting up and processing of reporting, monitoring and notifying actions. Specifically, some aspects of the disclosure provide self-contained reporting, monitoring and notifying framework for cloud computing services. A self-contained framework can provide to a recipient, a container (e.g., a message) that includes all the necessary information in the container for the recipient to understand, thus the recipient does not need cross referencing information out of the container to understand the received information.

It is noted that, in the present disclosure, a media processing system (also referred to as a media processing cloud in some examples) that performs network-based media processing (NBMP) is used as an example to illustrate the reporting, monitoring and notifying frameworks, and the reporting, monitoring and notifying frameworks can be used in other suitable cloud computing system.

In a media processing system, a NBMP source describes the requested media processing and provides information about the nature and format of the media data. Accordingly, an NBMP workflow manager can establish a media processing workflow and informs the NBMP source that the workflow is ready, and then media processing can start. For example, media source(s) can then start transmitting media to the network for processing.

In some embodiments, an NBMP workflow includes media processing tasks that are connected based on input/output relationships among the media processing tasks. Each of the media processing tasks performs a media processing operation, such as video decoding, video stitching, video encoding, and/or the like. In an example, a first media processing task performs a media processing operation based on inputs and generates outputs. The outputs of the first media processing task can be used as inputs to a second media processing task that is connected with the first media processing task. In other words, an NBMP workflow can be considered as a connected graph of media processing tasks.

The workflow manager can ensure the correct operation of the workflow by configuring and monitoring each task as well as the workflow output. In some examples, the workflow manager is configured to the select the media processing functions and instantiate the media processing functions as tasks based on the workflow description that is received from the NBMP source.

In a media processing system, suitable interactions can be performed to establish, load, instantiate and monitor media processing entities that will run the media processing tasks. In some examples, application programming interfaces (APIs) can be defined between an NBMP source and workflow manager; workflow manager and task(s); and an API is defined to discover appropriate function(s). In some examples, a media processing system is configured to be media format and protocol agnostic. The media processing system can identify and signal the media, metadata and auxiliary information formats for data exchanged between media source, the workflow manager and tasks.

In some examples, interfaces including both data formats and application programming interfaces (APIs) among the entities connected through digital networks for media processing can be defined. Users can access and configure user operations remotely for efficient, intelligent processing. The workflows to be applied to media data can be described and managed. The media data can be uploaded to the network, and the media processing tasks can be instantiated and configured. In some embodiments, dynamic creation of media processing pipelines, as well as access to processed media data and metadata in real-time or in a deferred way are enabled. The media and metadata formats used between the media source, workflow manager and media processing entities in a media processing pipeline are also specified.

In an example, clients (e.g., creators, service providers, and consumers of digital media) can describe media processing operations to be performed by media processing entities in a network. A workflow can be described by composing a set of media processing functions that are accessible through interfaces (e.g., NBMP APIs). A media processing entity (MPE) can run processing tasks applied on the media and the related metadata received from media source(s) or other tasks. The MPE can provide capabilities for configuring, managing, and monitoring processing tasks. A media processing task can be a process applied to media and metadata input(s), producing data and related metadata output(s) to be consumed by a media sink or other media processing tasks.

The media processing system can support various delivery methods such as streaming, file delivery, push-based progressive download, hybrid delivery, multipath, and heterogeneous network environments.

FIG. 1 shows an exemplary media processing system (e.g., NBMP system, a NBMP reference architecture, a NBMP architecture) (100) according to an embodiment of the disclosure. The media processing system (100) can include a plurality of entities, such as a NBMP source (101), a workflow manager (e.g., a NBMP workflow manager) (103), a function repository (105), a media source (111), a media processing entity (MPE) (113), a media sink (115), a third party entity, and/or the like. The media processing system (100) can include additional media source(s), media sink(s), and/or media processing entities. The media processing system (100) can process media data across one or more processing entities in a network. Information, such as various media and control information (or control data) for the media, can be communicated among the plurality of entities in the media processing system (100).

To provide a context for discussion purposes, the media processing system (100) is described as the NBMP system (100) below. The descriptions can be suitably adapted to any media processing system.

The NBMP source (101) can describe, or otherwise indicate, media processing in the network. The function repository (105) can include NBMP function descriptions of various NBMP functions. The NBMP source (101) and the workflow manager (103) can retrieve the NBMP function descriptions or functions from the function repository (105). An NBMP function can refer to implementation of a standalone and self-contained media processing operation and/or the corresponding description of the operation.

A processing task or a task can refer to a runtime instance of a NBMP function that is executed by the MPE (113). An NBMP workflow or a workflow can be represented by a graph (e.g., a directed acyclic graph (DAG)) of one or more connected task(s) that achieve the requested media processing. The workflow manager (103) can provision task(s) and connect the task(s) to create, control, manage and monitor a workflow, for example, based on a workflow description document (WDD).

The media source (111) can provide media content (e.g., media data, supplementary information) to be processed by a workflow. The supplementary information can include metadata or auxiliary information related to the media data. The media source (111) can provide an input to the workflow. The media sink (115) can consume an output of the workflow. The MPE (113) can run one or more media processing task(s) to process the media content.

Different entities (e.g., the NBMP Source (101), the workflow manager (103) and the MPE (113)) in the NBMP system (100) can use APIs to invoke and respond to media service requests. The APIs can include a NBMP workflow API or a workflow API, a function discovery API, and a task API. The workflow API can provide an interface between the NBMP Source (101) and the workflow manager (103). The task API can provide an interface between the workflow manager (103) and media processing tasks. The function discovery API can provide an interface between the workflow manager (103)/the NBMP Source (101) and the Function Repository (105).

NBMP interfaces described above can be used to create and control media processing workflows in the network. The NBMP system (100) can be split into a control plane and a media plane (or media data plane). The control plane can include the workflow API, the function discovery API, and the task API.

The workflow API can be used by the NBMP source (101) to create and control a media processing workflow. The NBMP Source (101) can use the workflow API to communicate with the workflow manager (103) for configuring and controlling media processing in the network. When the NBMP Source (101) sends a request to the workflow manager (103) by including a workflow resource (WR) in an operation of the workflow API, the workflow manager (103) can parse the WR, the included WDD and corresponding descriptors, and take the appropriate actions according to the requested operation. Then, the workflow manager (103) can acknowledge the request with a response. The workflow API operations can include creating a workflow (e.g., CreateWorkflow), updating a workflow (e.g., UpdateWorkflow), deleting a workflow (e.g., DeleteWorkflow), retrieving a workflow (e.g., RetrieveWorkflow), and the like.

The function discovery API can provide the means for the workflow manager (103) and/or the NBMP Source (101) to discover media processing functions that can be loaded as part of a media processing workflow.

The task API can be used by the workflow manager (103) to configure and monitor task(s) (e.g., a task 1 and a task 2 run by the MPE (113)) at runtime. The task API can define interface(s) for configuration of media processing tasks by the workflow manager (103), for example, after the resources for the task are allocated in the MPE (113). Task API operations can include creating a task (e.g., CreateTask), updating a task (e.g., UpdateTask), getting a task (e.g., GetTask), deleting a task (e.g., DeleteTask), and the like.

On the media plane, the media formats, the metadata, and the supplementary information formats between the NBMP Source (111) and task(s), as well as between the tasks can be defined.

A workflow description (WD) can be passed from the NBMP source (101) to the workflow manager (103). The WD can describe information such as input data and output data, functions and other requirements for the workflow.

The workflow manager (103) can receive a WDD from the NBMP source (101) and can build a workflow for requested media processing. In a workflow procedure, media processing functions can be selected, for example, from the function repository (105), and then corresponding media processing tasks can be configured and distributed to a set of one or more MPEs (e.g., including the MPE (113)).

The set of functions provided by the function repository (105) can be read by an NBMP source (101) and the workflow manager (103). In an embodiment, the NBMP source (101) requests the creation of a workflow using a set of functions in the function repository (105). Accordingly, the NBMP source (101) is configured to select functions for the workflow. The NBMP source (101) can request the creation of the workflow as described below. The NBMP source (101) can use a description of the media processing tasks by which the workflow is to be created, and can specify a connection map to define connections of inputs and outputs of the media processing tasks. When the workflow manager (103) receives the above information from the NBMP source (101), the workflow manager (103) can instantiate the media processing tasks based on respective function names and can connect the media processing tasks according to the connection map.

Alternatively, the NBMP source (101) can request the creation of a workflow using a set of keywords by which the workflow manager (103) can construct the workflow. Accordingly, the NBMP source (101) may not be aware of a set of functions to be inserted into the workflow. The NBMP source (101) can request the creation of the workflow as described below. The NBMP source (101) can use the set of keywords by which the workflow manager (103) can find the appropriate functions, and can specify the requirements of the workflow using suitable workflow description.

When the workflow manager (103) receives the above information (e.g., the set of keywords) from the NBMP source (101), the workflow manager (103) can create the workflow by searching for appropriate functions using the keywords, for example, specified in a processing descriptor. The workflow manager (103) can then use other descriptors in the workflow description to provision the media processing tasks and connect the media processing tasks to create the final workflow.

A processing model of the workflow manager (103) can be described as below.

The workflow manager (103) can discover available media processing functions as below. The NBMP function repository (105) can provide the function discovery interface (or API) to allow external entities to query for a media processing function that can fulfil the requested processing. The workflow manager (103) can have access to a directory service that offers a searchable list of media processing functions. The workflow manager (103) can use the description of the media processing tasks in the workflow description to find the appropriate functions for the workflow.

Selection of the media processing tasks for the workflow can be described below. When a request for media processing is received from the NBMP source (101), the workflow manager (103) can search the function repository (105) to find the list of all available functions that can fulfill the workflow. Using the workflow description from the NBMP Source (101), the workflow manager (103) can find the functions from the function repository (105) to implement the workflow, which can depend on the information for media processing from the NBMP Source (101). The information for media processing can include the input and output description, the description of the requested processing, and the information in other descriptors for functions in the function directory (105). Mapping of the source requests to appropriate media processing tasks to be included in the workflow can be a part of the implementation of the NBMP in the network. To reference and link input sources with input port names and output port names at the time of task creation, the input-ports and output-ports can be used to make references to the input streams.

A search for appropriate functions to be instantiated as tasks can be performed by the workflow manager (103) using a function discovery API. Alternatively, the workflow manager (103) can retrieve detailed information of some or all suitable functions in the function repository (105) using the function discovery API. The workflow manager (103) can then compare the information for media processing from the NBMP source (101) with different descriptors of each function.

Selected media processing tasks can be configured in the workflow. When the functions to be included in the workflow are identified, the NBMP workflow manager (103) can instantiate the functions as respective tasks and configure the tasks so that the tasks can be added to the workflow. The NBMP workflow manager (103) can extract the configuration data from the media processing information received from the NBMP source (101) and configure the corresponding tasks. The configuration of the tasks can be performed using a task API (e.g., NBMP task API).

Task allocation and distribution can be described below. The workflow manager (103) can use the workflow to perform processing deployment and configure the media processing entities. In an example, for computationally intensive media processing requests, the workflow manager (103) can set up multiple computational instances and distribute a workload among the multiple computational instances. Thus, the workflow manager (103) can connect and configure the multiple computational instances as needed. In an example, the workflow manager (103) allocates a same task to multiple instances and provisions a load balancer to distribute the workload among the multiple instances using a chosen scheduling mechanism. In an alternative example, the workflow manager (103) allocates different operations of the same task to different instances (e.g., parallel operations). In both examples described above, the workflow manager (103) can set up the workflow paths between the instances, and thus the suitable workload can be successfully realized. The workflow manager (103) can configure the tasks to push the processed media data/streams (or make them available through a pull mechanism) to a next task in the workflow graph.

When the workflow manager (103) receives a WDD from the NBMP Source (101), the workflow manager (103) can perform a selection of media processing functions to be inserted into the workflow. When the list of tasks to be included in the workflow is compiled, the workflow manager (103) can then connect the tasks to prepare the workflow.

Figure 2:
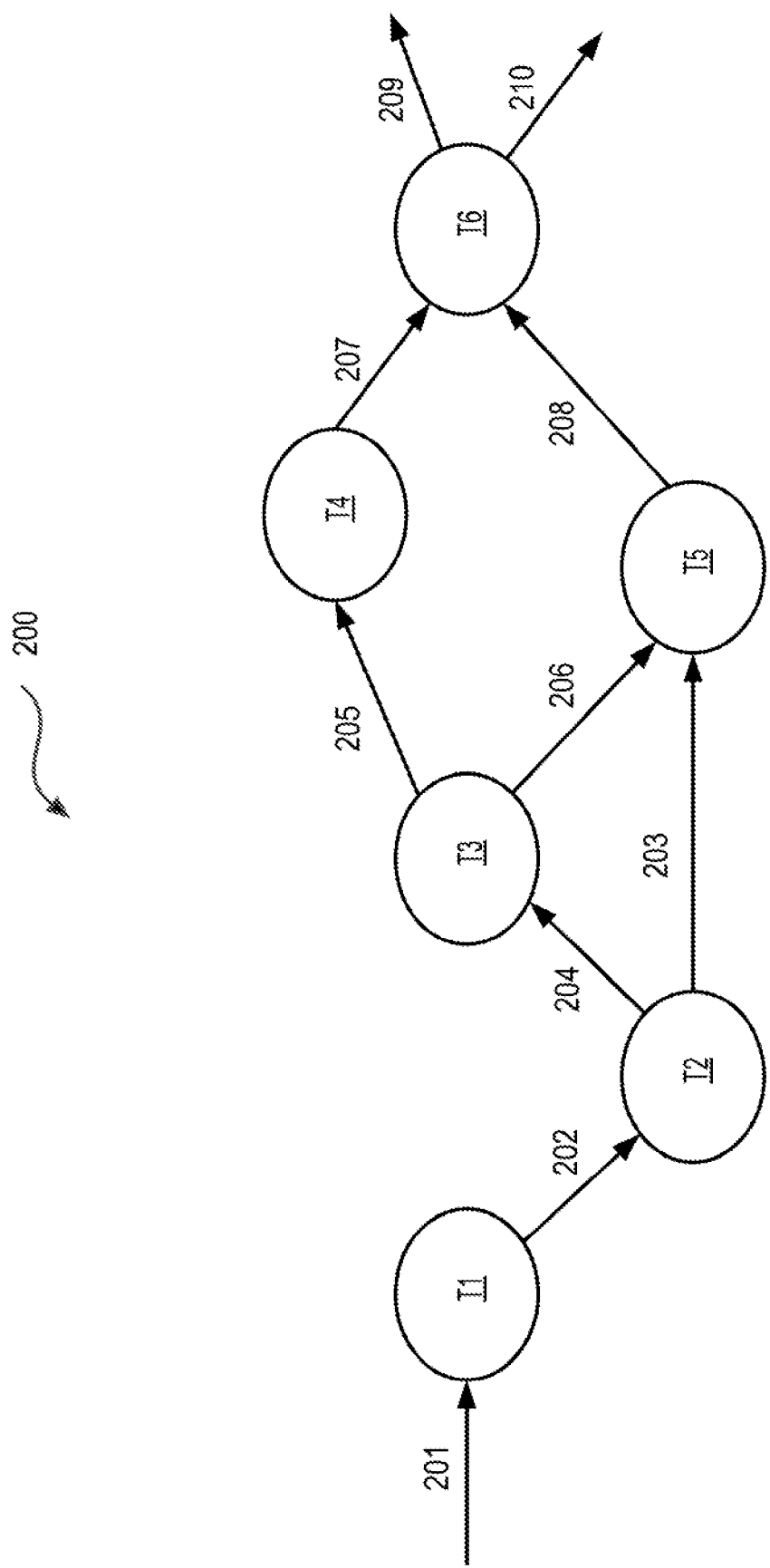
FIG. 2 shows an example of a graph according to an embodiment of the disclosure.

The workflow manager (103) can generate a workflow, for example, as represented by a graph (e.g., a DAG) from the WDD. FIG. 2 shows an example of a graph (e.g., a DAG) (200) according to an embodiment of the disclosure. The DAG (200) can include a plurality of nodes (T1)-(T6) and a plurality of links (or connections) (202)-(208). In an example, the DAG (200) represents the workflow (200).

Each node of the DAG (200) can represent a media processing task in the workflow (200). A link (e.g., the link (202)) connecting a first node (e.g., the node (T1)) to a second node (e.g., the node (T2)) in the DAG (200) can represent a transfer of an output of the first node (e.g., the node (T1)) as an input to the second node (e.g., the node (T2)).

In general, a workflow can include any suitable number of input(s) (or workflow input(s)) and any suitable number of output(s) (or workflow output(s)). The workflow input(s)

can be connected to the media source (111), other workflow (s), and/or the like, and the workflow output(s) can be connected to the media sink (115), other workflow(s), and/or the like. The workflow (200) has an input (201) and outputs (209) and (210). The workflow (200) can have one or more outputs from intermediate nodes in some embodiments.

According to some aspects of the disclosure, status reports can include information of variables and information of events for functions. For example, an NBMP function is an implementation of a processing operation. In some embodiments, an NBMP function can be a standalone and self-contained media processing operation and the corresponding description of the processing operation. In some examples, for each NBMP function, two independent descriptors are used in the description. One of the two independent descriptors is for events of the NBMP function and is referred to as events descriptor and the other one of the two independent descriptors is for variables and is referred to as variables descriptor. The variables descriptor includes characteristics of the variables, such as mathematical definitions, units, formats, universal identifiers and the like that are used to understand the variables. Thus, in some examples, the variables descriptor can be self-explanatory, and variables can be understood based on the variables descriptor and no need to refer other texts out of the variables descriptor. Similarly, the events descriptor includes characteristics of the events that are used to understand the events. Thus, in some examples, the events descriptor can be self-explanatory, and events can be understood based on the events descriptor and no need to refer other texts out of the events descriptor.

According to an aspect of the disclosure, workflow of a service can be performed on different systems (also referred to as platforms, cloud systems). Each system may have system variables and system events. The system variables and system events can be included in the status report.

In some embodiments, status reports are defined based on self-contained descriptors. In an example, a regular report is defined based on a self-contained descriptor that is referred to as reporting descriptor. For example, the regular report can include an object defined based on the reporting descriptor, and the object is referred to as a reporting descriptor object. The reporting descriptor object allows the regular report to include a subset of function variables and events, as well as system variables and events. The variables (e.g., function variables and system variables) can be included in the form defined based the variables descriptor and the events (e.g., function events and system events) can be included in the form defined based on events descriptor. Thus, the regular report can be self-explanatory, and the variables and the events can be understood based on the variables descriptor and events descriptor.

In another example, a notification report is defined based on a self-contained descriptor that is referred to as notification descriptor. For example, the notification report can include an object defined based on the notification descriptor, and the object is referred to as a notification descriptor object. The notification descriptor object allows the notification report to include a subset of function variables and events, as well as system variables and events. The variables (e.g., function variables and system variables) can be included in the form defined based the variables descriptor and events (e.g., function events and system events) can be included in the form defined based on events descriptor. Thus, the notification report can be self-explanatory, and the variables and the events can be understood based on the variables descriptor and events descriptor.

In another example, a monitoring report is defined based on a self-contained descriptor that is referred to as monitoring descriptor. For example, the monitoring report can include an object defined based on the monitoring descriptor, and the object is referred to as a monitoring descriptor object. The monitoring descriptor object allows the monitoring report to include a subset of function variables and events, as well as system variables and events. The variables (e.g., function variables and system variables) can be included in the form defined based the variables descriptor and events (e.g., function events and system events) can be included in the form defined based on events descriptor. Thus, the monitoring report can be self-explanatory, and the variables and the events can be understood based on the variables descriptor and events descriptor.

Specifically, in some examples, each function can include a list of variables described according to the variables descriptor.

FIG. 3 shows a list of variables in a function according to some embodiments of the disclosure. As shown in FIG. 3, the function includes one or more variables, such as Variable-1, Variable-2, Variable-3 and the like. The variables or a subset of the variables can be included in a regular report in response to a reporting action. The variables or a subset of the variables can be included in a monitoring report in response to a monitoring action. The variables or a subset of the variables can be included in a notification report in response to a notifying action.

In some embodiments, a variable descriptor object that is defined according to the variable descriptor can be included in a status report. The variable descriptor object can include an array of objects associated with variables. An object associated with a variable can include characteristics of the variable. For example, Object-1 includes the characteristics of Variable-1; Object-2 includes the characteristics of Variable-2; and Object-3 includes the characteristics of Variable-3.

FIG. 4 shows a table of characteristics for a variable according to some embodiments of the disclosure. The table also includes explanation of the characteristics. For example, an object associated with a variable includes a name for the variable, a definition for the variable, a value of the variable, a unit for the variable, a parameter type for the variable and possibly a range for the variable (including a min value and a max value for the variable), and the like.

FIG. 5 shows an example of a variables descriptor schema according to some embodiments of the disclosure. As shown, the variable descriptor is an array of objects (e.g., items) associated with variables.

Further, in some examples, each function includes a list of events described according to an events descriptor.

FIG. 6 shows a list of events in a function according to some embodiments of the disclosure. As shown in FIG. 6, the function includes one or more events, such as Event-1, Event-2, and the like. The events or a subset of the events can be included in a regular report in response to a reporting action. The events or a subset of the events can be included in a monitoring report in response to a monitoring action. The events or a subset of the events can be included in a notification report in response to a notifying action.

In some embodiments, an event descriptor object that is defined according to the event descriptor can be included in a status report. The event descriptor object can include an array of objects associated with events. An object associated with an event can include characteristics of the event. For example, Object-1 includes the characteristics of Event-1; Object-2 includes the characteristics of Event-2.

FIG. 7 shows a table of characteristics for an event according to some embodiments of the disclosure. The table also includes explanation of the characteristics. For example, an object associated with an event includes name of the event, definition of the event and the like.

FIG. 8 shows an example of an events descriptor schema according to some embodiments of the disclosure. As shown, the events descriptor can includes an array of objects (items) associated with events.

According to an aspect of the disclosure, reporting is an act of regularly reporting information (e.g., generating and sending regular reports) to a destination. In some embodiments, reporting can be setup in response to request. In some examples, a requesting entity sends a request to a reporting entity. The request includes a first reporting descriptor object that is defined according to reporting descriptor. The first reporting descriptor object can include a list of desired variables and events to report, a destination to send the report, and the like. Then, the reporting entity sends the destination defined in the first reporting descriptor object, the events and variable values described in the first reporting descriptor object. For example, a regular report includes a second reporting descriptor object that is similar to the first reporting descriptor object. The second reporting descriptor object can include updated values for variables and occurrence information of the events. Generally, the reporting descriptor also includes frequency of reporting, the start time of reporting and delivery protocol of regular reports. It is noted that the destination can be the requesting entity and can be an entity different from the requesting entity.

In the media processing system (100), the requesting entity can be the NBMP source (101) or the workflow manager (103). The reporting entity can be workflow manager (103) or media processing tasks.

In an example, the workflow manager (103) can send a request, via a task API, to a media processing task (e.g., TASK 1 executed by MPE (113)) for regular reporting. The workflow manager (103) can specify the desired variables and events, the time-interval, grouping, the destination and protocol in a first reporting descriptor object in the request. Then, the media processing task can send regular reports based on the time-interval to the destination using the protocol specified in the first reporting descriptor object. A regular report includes a second reporting descriptor object that carries the information of the variables and events to report and other information, such as the time-interval, grouping, the destination, protocol and the like.

In another example, the NBMP source (101) can setup one or more reporting schemes and can send a request, via workflow API, to the workflow manager (103) for regular reporting. Then, the workflow manager (103) can generate regular reports or the workflow manager (103) can request a media processing task to generate regular reports. The NBMP source (101) can specify the desired variables and events, the time-interval, grouping, the destination and protocol in a first reporting descriptor object in the request. Then, the workflow manager (103) or the media processing task can send regular reports based on the time-interval to the destination using the protocol specified in the first reporting descriptor object. A regular report includes a second reporting descriptor object that carries the information of the variables and events to report and other information, such as the time-interval, grouping, the destination, protocol and the like.

In some embodiments, HTTP/1.1 is used as the protocol, and POST method is used for sending the regular reports in POST messages. For example, a body of a POST message includes a reporting descriptor object. In some examples, the body of the POST message also includes a request descriptor object in order to identify the report. In an example, the request descriptor object includes an identification of the request, a priority, and a task identification for the media processing task.

FIG. 9 shows a table of parameters in a reporting descriptor and the corresponding types for the parameters and FIG. 10 shows an example of a reporting descriptor schema according to some embodiments of the disclosure. It is noted that system-events include events that belong to the media processing system and can be provided by the cloud in the same format as the events of the function. It is also noted that system-variables include variables that belong to the media processing system and can be provided by the cloud in the same format as the variables of the function. In some embodiments, the (function) variables can be included in a first variables descriptor object, and system variables can be included in a second variables descriptor object; the (function) events can be included in a first events descriptor object, and system events can be included in a second events descriptor object.

According to another aspect of the disclosure, notification is an act of reporting information (e.g., generating and sending notification report) to a destination when an event occurs. In some embodiments, notification is setup in response to request. In some examples, a requesting entity sends a request to a notifying entity. The request includes a first notification descriptor object defined according to the notification descriptor. The first notification descriptor object can specify, for example, a list of desired variables and events, a destination to send the report, and the like. Then, when one or more of the events listed in the first notification descriptor object occurs, the notifying entity sends the destination defined in the first notification descriptor object, the events and variable values described in the first notification descriptor object. For example, a notification report includes a second notification descriptor object that is similar to the first notification descriptor object. The second notification descriptor object can include updated values for variables and occurrence information of the events. Generally, the notification descriptor can also include other suitable information for notification, such as the start time, notification interval, delivery protocol, and the like. It is noted that the destination can be the requesting entity and can be an entity different from the requesting entity.

In the media processing system (100), the requesting entity can be the NBMP source (101) or the workflow manager (103). The notifying entity can be workflow manager (103) or media processing tasks.

In an example, the workflow manager (103) can send a request, via a task API, to a media processing task (e.g., TASK 1 executed by MPE (113)) for notification. The workflow manager (103) can specify a list of subscribed events for notification, a list of variables, the destination and protocol in a first notification descriptor object in the request. Then, when one or more events in the list of subscribed events occurs, the media processing task can send a notification report to the destination using the protocol specified in the notification descriptor. A notification report includes a second notification descriptor object that carries the information of the variables in the list of variables, information of events in the list of subscribed events and other information.

In another example, the NBMP source (101) can setup one or more notification schemes and can send a request, via workflow API, to the workflow manager (103) for notification. Then, the workflow manager (103) can generate notification reports or the workflow manager (103) can request a media processing task to generate notification reports. The NBMP source (101) can specify a list of subscribed events, a list of variables, the destination and protocol in a first notification descriptor object in the request. Then, when any of the events in the list of subscribed events occurs, the workflow manager (103) or the media processing task can send a notification report to the destination using the protocol specified in the notification descriptor. A notification report includes a second notification descriptor object that carries the information of the variables and information of the events, and other information of the regular reports, such as the destination, protocol and the like.

In some embodiments, HTTP/1.1 is used as the protocol, and POST method is used for sending the notification reports in POST messages. For example, a body of a POST message includes a notification descriptor object. In some examples, the body of the POST message also includes a request descriptor object in order to identify the notification. In an example, the request descriptor object includes an identification of the request, a priority, and a task identification for the media processing task.

FIG. 11 shows a table of parameters in a notification descriptor and the corresponding types for the parameters and FIGS. 12A-B show an example of a notification descriptor schema according to some embodiments of the disclosure. It is noted that system-events include events that belong to the media processing system and can be provided by the cloud in the same format as the events of the function. It is also noted that system-variables include variables that belong to the media processing system and can be provided by the cloud in the same format as the variables of the function. In some embodiments, the (function) variables can be included in a first variables descriptor object, and system variables can be included in a second variables descriptor object; the (function) events can be included in a first events descriptor object, and system events can be included in a second events descriptor object.

According to another aspect of the disclosure, monitoring is an act of an entity requesting information and receiving the requested information. In some embodiments, monitoring can be performed in response to request. In some examples, a monitoring entity (an entity who monitors) sends a monitoring update request to a monitored entity (an entity being monitored). The monitoring update request includes a first monitoring descriptor object defined according to monitoring descriptor. The first monitoring descriptor object can specify, for example, a list of desired variables and event. In response to the monitoring update request, the monitored entity sends to the monitoring entity a monitoring reporting with a second monitoring descriptor object that carries values of the requested variables and a subset of events from the desired events that have occurred.

In the media processing system (100), the monitoring entity can be the NBMP source (101) or the workflow manager (103). The monitored entity can be workflow manager (103) or media processing tasks.

In an example, the workflow manager (103) can send a monitoring update request, via a task API, to a media processing task (e.g., TASK 1 executed by MPE (113)). The workflow manager (103) can specify the desired variables and events in a first monitoring descriptor object in the monitoring update request. In response to the monitoring update request, the media processing task can send a monitoring report to the workflow manager (103). The monitoring report includes a second monitoring descriptor object that carries the information of the variables and events to report.

In another example, the NBMP source (101) can send a monitoring update request, via workflow API, to the workflow manager (103). The NBMP source (101) can specify the desired variables and events in a first monitoring descriptor object in the monitoring update request. In response to the monitoring update request, the workflow manager (103) can generate a monitoring report and send to the NBMP source (101). A monitoring report includes a second monitoring descriptor object that carries the information of the variables and events to report.

FIG. 13 shows a table of parameters in a monitoring descriptor and the corresponding types for the parameters and FIG. 14 shows an example of a monitoring descriptor schema according to some embodiments of the disclosure. It is noted that system-events include events that belong to the media processing system and can be provided by the cloud in the same format as the events of the function. It is also noted that system-variables include variables that belong to the media processing system and can be provided by the cloud in the same format as the variables of the function. In some embodiments, the (function) variables can be included in a first variables descriptor object, and system variables can be included in a second variables descriptor object; the (function) events can be included in a first events descriptor object, and system events can be included in a second events descriptor object.

In some embodiments, HTTP/1.1 is used as the protocol, and POST method is used for sending the monitoring reports in POST messages. For example, a body of a POST message includes a monitoring descriptor object. In some examples, the body of the POST message also includes a request descriptor object in order to identify the monitoring reports.

Figure 15:
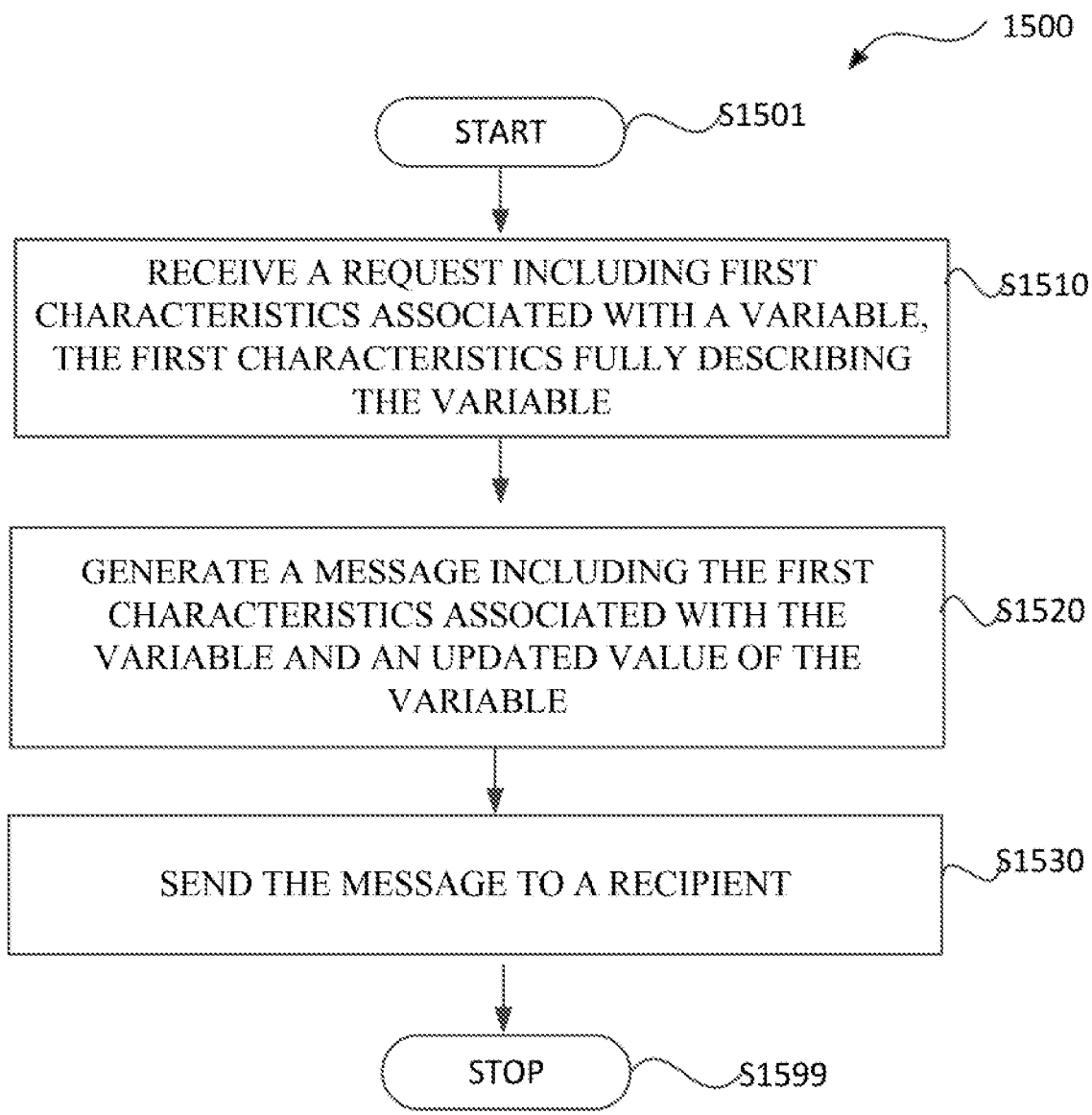
FIG. 15 shows a flow chart outlining a process according to an embodiment of the disclosure.

FIG. 15 shows a flow chart outlining a process (1500) according to an embodiment of the disclosure. In an example, the process (1500) is executed in a cloud, such as the media processing system (100), and the like. In some embodiments, the process (1500) is implemented in software instructions, thus when the processing circuitry executes the software instructions, the processing circuitry performs the process (1500). The process starts at (S1501) and proceeds to (S1510).

At (S1510), a request including first characteristics associated with a variable is received. The first characteristics associated with the variable can fully describe the variable. For example, the first characteristics include a definition of the variable, a unit of the variable, a format of the variable, a universal identifier of the variable and the like. The variable can be understood based on the first characteristics without cross referencing other texts out of the first characteristics. In some embodiments, the first characteristics are a portion of a first variables descriptor object. The first variables descriptor object includes an array of objects respectively associated with variables. The variables can be function variables or system variables. The request can also include a first events descriptor object that includes an array of objects respectively associated events. The events can be function events or system events.

In an example, the request is sent from the NBMP source (101) to the workflow manager (103). In another example, the request is sent from the workflow manager (103) to a media processing task.

At (S1520), a message is generated, the message includes the first characteristics of the variable and an updated value of the variable.

In an embodiment, the request includes a first reporting descriptor object to request regular reports. The first reporting descriptor object can include a first variable descriptor object associated with variables, a first event descriptor object with associated with events, and a reporting interval. Based on the first reporting descriptor object, a message is generated regularly based on the reporting interval. The message can include a second reporting descriptor object. For example, the second reporting descriptor object includes a second variables descriptor object that is similar to the first variables descriptor object with updated values for the variables. The second reporting descriptor object in the message can also include a second event descriptor object having a subset of events based on occurrences of the events.

In another embodiment, the request includes a first notification descriptor object to request notification report that is triggered by occurrence of events. The first notification descriptor object can include a first variable descriptor object associated with variables, and a first event descriptor object associated with events. Then, in response to an occurrence of at least one of the subscribed events, the message is generated. The message includes a second notification descriptor object that is similar to the first notification descriptor object. For example, the second notification descriptor object includes a second variables descriptor object that is similar to the first variable descriptor object but with updated values for the variables. The second notification descriptor object also includes a second events descriptor object having a subset of the subscribed events.

In another embodiment, the request includes a first monitoring descriptor object to request a monitoring report. The first monitoring descriptor object can include with a first variable descriptor object associated with variables, and a first event descriptor object associated with events. Then, in response to the request, the message is generated. The message includes a second monitoring descriptor object that is similar to the first monitoring descriptor object. For example, the second monitoring descriptor object includes a second variables descriptor object that is similar to the first variable descriptor object but with updated values for the variables. The second monitoring descriptor object also includes a second events descriptor object having a subset of the events.

At (S1530), the message is sent to a recipient, and the process proceeds to S1599 and terminates.

In the example of regular report, the first and second reporting descriptor objects include a destination (e.g., url), and the message is sent to the destination.

In the example of notification report, the first and second notification descriptor objects include a destination (e.g., url), and the message is sent to the destination.

In the example of monitoring report, the message is sent to the entity where the request came from.

The process (1500) can be suitably adapted. Step(s) in the process (1500) can be modified and/or omitted. Additional step(s) can be added. Any suitable order of implementation can be used.

The techniques described above, can be implemented as computer software using computer-readable instructions and physically stored in one or more computer-readable media. The methods and embodiments in the disclosure may be used separately or combined in any order. Further, each of the methods (or embodiments), functions or tasks, may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 16 shows a computer system (1600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 16:
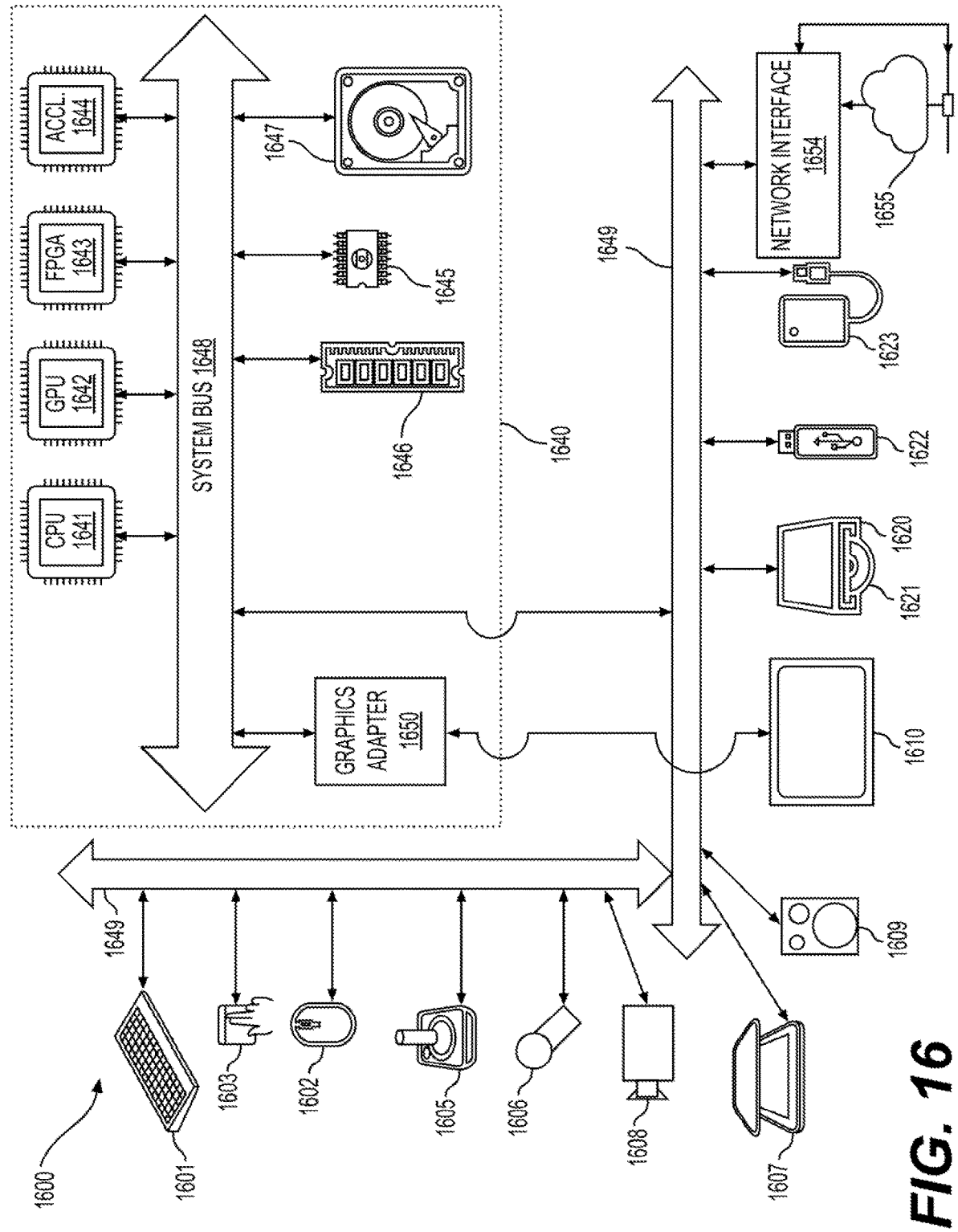
FIG. 16 is a schematic illustration of a computer system in accordance with an embodiment.

The components shown in FIG. 16 for computer system (1600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1600).

Computer system (1600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1601), mouse (1602), trackpad (1603), touch screen (1610), data-glove (not shown), joystick (1605), microphone (1606), scanner (1607), camera (1608).

Computer system (1600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1610), data-glove (not shown), or joystick (1605), but there can also be tactile feedback devices that do not serve as input devices), audio output devices (such as: speakers (1609), headphones (not depicted)), visual output devices (such as screens (1610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1600) can also include human accessible storage devices and their associated media such as optical media including CD/DVD ROM/RW (1620) with CD/DVD or the like media (1621), thumb-drive (1622), removable hard drive or solid state drive (1623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1600) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1649) (such as, for example USB ports of the computer system (1600)); others are commonly integrated into the core of the computer system (1600) by attachment to a system bus as described below (for example Ethernet interface into a PC computer system or cellular network interface into a smartphone computer system). Using any of these networks, computer system (1600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1640) of the computer system (1600).

The core (1640) can include one or more Central Processing Units (CPU) (1641), Graphics Processing Units (GPU) (1642), specialized programmable processing units in the form of Field Programmable Gate Areas (FPGA) (1643), hardware accelerators for certain tasks (1644), and so forth. These devices, along with Read-only memory (ROM) (1645), Random-access memory (1646), internal mass storage such as internal non-user accessible hard drives, SSDs, and the like (1647), may be connected through a system bus (1648). In some computer systems, the system bus (1648) can be accessible in the form of one or more physical plugs to enable extensions by additional CPUs, GPU, and the like. The peripheral devices can be attached either directly to the core's system bus (1648), or through a peripheral bus (1649). Architectures for a peripheral bus include PCI, USB, and the like.

CPUs (1641), GPUs (1642), FPGAs (1643), and accelerators (1644) can execute certain instructions that, in combination, can make up the aforementioned computer code. That computer code can be stored in ROM (1645) or RAM (1646). Transitional data can be also be stored in RAM (1646), whereas permanent data can be stored for example, in the internal mass storage (1647). Fast storage and retrieve to any of the memory devices can be enabled through the use of cache memory, that can be closely associated with one or more CPU (1641), GPU (1642), mass storage (1647), ROM (1645), RAM (1646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1600), and specifically the core (1640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1640) that are of non-transitory nature, such as core-internal mass storage (1647) or ROM (1645). The software implementing various embodiments of the present disclosure can be stored in such devices and executed by core (1640). A computer-readable medium can include one or more memory devices or chips, according to particular needs. The software can cause the core (1640) and specifically the processors therein (including CPU, GPU, FPGA, and the like) to execute particular processes or particular parts of particular processes described herein, including defining data structures stored in RAM (1646) and modifying such data structures according to the processes defined by the software. In addition or as an alternative, the computer system can provide functionality as a result of logic hardwired or otherwise embodied in a circuit (for example: accelerator (1644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for cloud service, comprising:
  receiving, by processing circuitry that operates for a cloud service, a request including a first reporting descriptor object including (i) a first variables descriptor object associated with variables, (ii) a first events descriptor object associated with events, and (iii) a reporting interval;
  generating, by the processing circuitry, at a time within the reporting interval, a message including a second reporting descriptor object with (i) a second variables descriptor object having updated values for the variables and (ii) a second events descriptor object associated with a subset of the events; and
  sending, by the processing circuitry, the message to a recipient.

2. The method of claim 1, wherein the first variables descriptor object comprises respective definitions of the variables, respective units of the variables, respective formats of the variables, and respective universal identifiers of the variables.

3. The method of claim 1, wherein the processing circuitry is configured to establish and manage a workflow for the cloud service.

4. The method of claim 1, wherein the processing circuitry is configured to perform one or more tasks in a workflow for the cloud service.

5. The method of claim 1, wherein
the first variables descriptor object describe the events, and
the second events descriptor object included in the second reporting descriptor object in the generated message indicates an occurrence of the subset of the events.

6. The method of claim 5, wherein the variables include at least one of a function variable or a system variable, and the events include at least one of a function event or a system event.

7. The method of claim 1, wherein
the events of the first events descriptor object are subscribed events, and
the second events descriptor object indicates an occurrence of at least one of the subscribed events.

8. The method of claim 1, wherein the method further comprises:
receiving the request from a monitoring entity;
generating, in response to the request, the message; and
sending the message to the monitoring entity.

9. The method of claim 1, wherein the message includes a request descriptor object that identifies the request.

10. An apparatus for providing a cloud service, comprising:
processing circuitry configured to:
receive a request including a first reporting descriptor object including (i) a first variables descriptor object associated with variables, (ii) a first events descriptor object associated with events, and (iii) a reporting interval;
generating, at a time within the reporting interval, a message including a second reporting descriptor object with (i) a second variables descriptor object having updated values for the variables and (ii) a second events descriptor object associated with a subset of the events; and
sending the message to a recipient.

11. The apparatus of claim 10, wherein the first variables descriptor object comprises respective definitions of the variables, respective units of the variables, respective formats of the variables, and respective universal identifiers of the variables.

12. The apparatus of claim 10, wherein the processing circuitry is configured to establish and manage a workflow for the cloud service.

13. The apparatus of claim 10, wherein the processing circuitry is configured to perform one or more tasks in a workflow for the cloud service.

14. The apparatus of claim 10, wherein
the first variables descriptor object describe the events, and
the second events descriptor object included in the second reporting descriptor object in the generated message indicates an occurrence of the subset of the events.

15. The apparatus of claim 14, wherein the variables include at least one of a function variable or a system variable, and the events include at least one of a function event or a system event.

16. The apparatus of claim 10, wherein
the events of the first events descriptor object are subscribed events, and
the second events descriptor object indicates an occurrence of at least one of the subscribed events.

17. The apparatus of claim 10, wherein the processing circuitry is configured to:
receive the request from a monitoring entity;
generate, in response to the request, the message; and
send the message to the monitoring entity.

18. The apparatus of claim 11, wherein the message includes a request descriptor object that identifies the request.

19. A non-transitory computer-readable storage medium storing computer-readable instructions thereon, which, when executed by processing circuitry of a cloud service, cause the processing circuitry to perform a method for cloud service, the method comprising:
receiving a request including a first reporting descriptor object including (i) a first variables descriptor object associated with variables, (ii) a first events descriptor object associated with events, and (iii) a reporting interval;
generating, at a time within the reporting interval, a message including a second reporting descriptor object with (i) a second variables descriptor object having updated values for the variables and (ii) a second events descriptor object associated with a subset of the events; and
sending the message to a recipient.

20. The non-transitory computer-readable storage medium of claim 19, wherein the first variables descriptor object comprises respective definitions of the variables, respective units of the variables, respective formats of the variables, and respective universal identifiers of the variables.

* * * * *